United States Patent [19]

Kim et al.

[11] 4,084,017
[45] Apr. 11, 1978

[54] FIBROUS PROTEIN MATERIALS

[75] Inventors: Myung Ki Kim, Congers; Joaquin Castro Lugay, Thornwood, both of N.Y.

[73] Assignee: General Foods Corporation, White Plains, N.Y.

[21] Appl. No.: 697,077

[22] Filed: Jun. 16, 1976

Related U.S. Application Data

[63] Continuation-in-part of Ser. No. 480,987, Jun. 18, 1974, Pat. No. 4,001,459.

[51] Int. Cl.$^2$ .............................................. A23J 3/00
[52] U.S. Cl. .................................. 426/656; 426/657; 426/426; 426/515; 426/524; 426/802
[58] Field of Search ............... 426/104, 656, 657, 385, 426/426, 429, 430, 431, 515, 802, 524

[56] References Cited

U.S. PATENT DOCUMENTS

| | | |
|---|---|---|
| B 480,987 | 3/1976 | Kim et al. .................. 426/802 X |
| 3,801,713 | 4/1974 | Tolstoguzov et al. .......... 426/802 X |
| 3,870,808 | 3/1975 | Bayer et al. ................ 426/657 X |
| 3,881,032 | 4/1975 | Matsumoto et al. ........... 426/524 X |
| 3,920,853 | 11/1975 | Middendorf et al. .......... 426/656 X |
| 3,925,903 | 12/1975 | Ward ....................... 426/429 X |

*Primary Examiner*—Raymond N. Jones
*Assistant Examiner*—Esther M. Kepplinger
*Attorney, Agent, or Firm*—T. J. Carvis; D. J. Donovan; B. P. Struzzi

[57] ABSTRACT

Disclosed is a method for producing fibrous protein materials useful for fish analogs. According to this method, an aqueous mixture of a heat coagulable protein is frozen by cooling the mixture in a manner and at a rate effective to produce elongated ice crystals generally aligned perpendicular to the surface of cooling, then subjected to a temperature substantially different from that of the frozen mass, and the protein in the frozen mass is then stabilized effectively to preserve its structural integrity during subsequent heating to set the protein.

10 Claims, No Drawings

FIBROUS PROTEIN MATERIALS

BACKGROUND OF THE INVENTION

This application is a continuation-in-part of prior filed copending Application Ser. No. 480,987, filed June 18, 1974 now U.S. Pat. No. 4,001,459.

This invention relates to textured proteins. More specifically, the present invention provides a new process for preparing fibrous protein materials which can be used as, or in the production of, fish analogs.

In recent years, considerable research efforts have been focused upon developing new technology for producing meat-like, protein-containing foods from various vegetable and animal protein sources. Economics provides a major incentive. It would clearly be advantageous to substitute, at least in part, the more efficient process of growing vegetable protein for the rather inefficient process by which animals convert the proteinaceous vegetable materials into meat. This is especially true where the ever-increasing human population is feared to be out-distancing the availability of grazing land for meat-producing animals. Additionally, recent efforts have also been directed to avoiding certain natural products which may be undesirable for religous, ethnic, or health reasons.

All natural meats, including fish and poultry, have fibrous structures. The texture of the meat products is inherently dependent upon the fibrous nature of the meat. Likewise, the presence of a fibrous structure is an important factor in fabricated meat-like products. Thus, in producing these meat-like products, e.g. meat analogs, much effort has been directed to creating a fibrous structure, similar to natural meat. Many workers have developed a wide variety of techniques for obtaining fibrocity, and a good deal of published literature is available on the production of meat analogs with fibrous structures.

One early worker, Boyer, in U.S. Pat. No. 2,682,466 disclosed the formation of synthetic meat products containing quantities of vegetable protein filaments. These protein filaments are made by forcing a colloidal protein dispersion through a porous membrane, such as a spinnerette, into a coagulating bath causing precipitation of the protein in filament form. The filaments are assembled into a meat-like product by employing binding materials, including cereals and protein. The use of spun vegetable fibers enables the formation of a highly aligned fibrous structure. Unfortunately, the manufacture of spun fibers is complicated and relatively high in cost. Moreover, spun vegetable protein is generally poor nutritionally because the starting material depends on soy isolate.

In view of the difficulties inherent in spun fiber technology, other workers were encouraged to seek alternatives to this technique. One alternative, disclosed in U.S. Pat. No. 3,488,770, describes the production of a proteinaceous meat-like product having an open celled structure with cell length greater than cell width, and with the cells being substantially aligned. This product is made by extruding a dough, substantially free of non-proteinaceous filler, into an area of reduced pressure to cause expansion. Another alternative process working with a dough is disclosed in U.S. Pat. No. 3,693,533. According to that process, the protein containing dough is coagulated while being passed through a set of converging conveyors. The resulting stretching during coagulation produces what are described as unidirectional fibers. While these processes are potentially less costly than the spun fiber technology, they suffer a penalty in the quality of the fibers produced.

Several workers, in Japanese Specifications 48-21,502 and 48-34,228, and United States Pat. Nos. 3,870,808 and 3,920,853 describe the production of fibrous protein masses by processing including freezing a protein solution or dispersion and heating the frozen mass to heat set the protein. These fibrous products are described as being meat-like. Also, applicants' copending Application Ser. No. 480,987 describes and claims such a process where improved products are obtained due to the employment of a freeze drying step prior to heat setting.

Even taking the best of these teachings, however, the art has yet to closely reproduce the type of fibers normally present in fish meats such as tuna. The fish fibers are well ordered, but generally flake-like. This type of texture is highly desirable when trying to simulate natural fish meat.

SUMMARY OF THE INVENTION

In view of difficulties with prior art techniques, it would be advantageous to have a method which would be capable of producing a textured protein material having a highly-defined, fish-like fibrous structure which would be both nutritious and economical.

Accordingly, it is an object of the present invention to provide a simple and economical method for producing a high quality textured protein material having a highly-defined, fish-like fibrous structure, high nutrition, excellent rehydration characteristics and good overall texture.

These and other objects are accomplished according to the present invention which provides a method for producing fibrous, fish-like protein materials. This method, in its broad aspects, comprises freezing an aqueous mixture of heat coagulable protein by cooling in a manner and at a rate effective to create elongated ice crystals generally aligned perpendicular to the surface of cooling, subjecting the frozen mass to a temperature substantially different than that of the frozen mass to cause a temperature stress in the material at lines of weakness in the frozen mass perpendicular to the aligned ice crystals, stabilizing the protein in the frozen mass effectively to prevent loss of fibrous structure during heating, and heating the stabilized material to coagulate the protein.

DETAILED DESCRIPTION

According to the present invention, a wide variety of fish-like textures can be simulated using a wide variety of protein materials. The common characteristic of all of these products is the presence of well-defined, well-ordered fibers separated by lines of cleavage generally perpendicular to the direction of alignment of the fibers. The fibers are produced by the present method from protein of vegetable or animal origin—used separately or in combination. In this manner it is possible to easily balance the textural, taste and nutritional characteristics of the fibers to provide a textured protein material having the desired characteristics. Among the features important to the present invention are: the need for cooling in a direction and at a rate effective to produce the well-defined, well-ordered ice crystals; the need for a shock temperature stressing step to produce the lines of cleavage perpendicular to the orientation of the fibers;

and the need to stabilize the protein prior to heat setting.

Any edible protein, or combination of proteins, can be employed in the process of the present invention, providing that the sole protein or, in the case of combinations, at least one of the proteins is soluble or partially soluble and can be stabilized by treatment according to this invention. In general, proteins having excellent solubility provide excellent, distinct fibrous structures — probably because the ice crystals can grow freely, unrestricted by undissolved solids. However, protein solutions containing considerable insoluble material, such as soy flour, meat homogenates, and fish homogenates, can also be employed with good results to form fibrous structures according to the present invention. Representative of the protein materials which can be employed to give excellent results according to the present process are soy milk, soy isolates, whole milk, meat slurries, fish slurries, gluten, soy flour, wheat protein concentrate, milk whey, egg protein, blood protein, single cell protein and the like.

The final texture of the products depends in part on the protein source employed, as well as the additives such as flavoring, fillers, fat, carbohydrates, salts, and the like. For example, the products prepared from soy milk have a juicy, smooth, soft texture with good fiber tensile strength. The soy milk produces a product having a desirable smoothness and softness, probably due to the oil emulsified in the protein. Soy flour, on the other hand, gives a product with lower tensile strength than the soy milk, but this type of tenderness is desired in some products either alone or as a component with another protein material.

The protein, from whatever source, is admixed with water to form an aqueous protein mixture wherein at least a portion of the protein is dissolved in the water. The aqueous protein mixture can be characterized as a solution, dispersion or suspension of protein and water. To increase the degree of solubility of the protein, which varies for different types of protein, the pH of the mixture can be adjusted. To obtain the optimum tensile strength and fiber integrity it is usually desirable to adjust the pH of the aqueous protein mixture to the point of maximum protein solubility. The pH of the mixture appears to directly affect the tensile strength of the final textured product. Some protein materials such as soy flour, give better texture and tensile strength at high pH, e.g. pH 10, than at lower pH. This is probably because these proteins are more soluble at higher pH, and are partially dissociated and denatured by the alkaline condition before texturization. At high pH, the protein molecules tend to unfold, allowing more complete dissociation and apparently allowing more freedom of movement during freezing to form more perfect fibers. Some proteins, such as egg white, have good solubility at their natural pH and need not have their pH adjusted to alkaline condition.

While high pH is sometimes useful in preparing the textured product, excessively high pH values are not generally desirable. The pH of the final product can be reduced during rehydration, to be later explained in detail, by the use of an acid in the rehydration bath. At times, however, reducing the pH of the textured product to a level below the point at which the particular protein is immobilized, may affect the texture of the product. Depending on the particular end use contemplated, this textural effect may be desirable or undesirable. For the proteins which are solubilized at their natural pH of 6 to 8, no neturalization will be needed.

The aqueous protein mixture is easily obtained by mixing the protein in water. If necessary, the protein material can be finely divided or comminuted either before or after mixing with the water; and, the pH can be adjusted to obtain the optimum solubility. The presence of soluble and insoluble non-coagulating materials is acceptable, and indeed in some cases desirable so long as it does not adversely affect the desirable qualities of the fiber structure for a particular application. In some cases, the presence of excessive amounts of fat would be undesirable where it would reduce the tensile properties of the fibers. However, in other cases, a reduced tensile strength would be desirable as it would impart a more tender texture to the product. Thus, those additives normally employed in forming fibrous meat analog products can be employed according to the present invention, it being realized that the process of the present invention provides a process capable of widely modifying the compositional features of the fiber forming material to obtain a wide variety of textural and nutritional variations from the single basic process. It is an added advantage of the present invention that relatively high fat contents can be employed and a good fiber structure obtained.

The solids concentration of the mixture can affect both product texture and processing efficiency. It is generally desirable to maintain low solids concentrations. One reason is that there is a tendency to diminish the distinct fibrous structure by increasing the concentration of solids. Typically, the solids will not exceed about 40%, and preferably not more than about 35% of the mixture on a weight basis. When the solids concentration increases, the efficiency of the stabilizing treatment is decreased. However, processing at excessively low concentrations loses economy due to the increased costs of removing the water. The costs for energy, vessels, transfer and storage equipment increase rapidly as concentration is reduced. However, the quality of the fibers produced at low concentrations is high. It is therefore necessary to determine the optimum concentration for each particular system, understanding that there are many influences which must be considered. In a very broad sense it can be said that the optimum concentration for freezing will be anywhere from 3% to about 35% protein, with concentrations of from 10 to 30% being preferred, based upon the total weight of the aqueous protein mixture. It is clear however that the optima for particular protein and additive materials, may vary widely within this range and at times extend beyond this range.

Those skilled in the art will be able to determine the optima for the particular systems employed, especially with a knowledge of the economics of their particular processing equipment and procedures. Reference to the examples below will provide those skilled in the art with working examples of a number of different systems. Any concentration effective to produce substantially independent, oriented fibers is acceptable according to the present invention. The particular concentration must be determined in each case for the balance of product physical properties and processing efficiency which is desirable and justified. It is noted that a gelled protein material of the type employed in forming Tofu, where the water is restricted from forming long crystals by the gel structure, cannot be employed according to the present invention.

Once prepared, the aqueous protein mixture is frozen by cooling according to a defined directional pattern to provide a well-defined, well-ordered fibrous structure produced by the ice crystals. As the water is frozen to ice crystals, the remaining protein mixture becomes more concentrated. The formation of the ice crystals separates the protein material into distinct, generally parallel aligned zones. Any means capable of accomplishing this result is suitable according to the present invention. The ice crystals form in a latice-work entrapping protein in orderly fiber-like portions between the elongated ice crystals. The zones of protein material are separated from each other almost completely — forming substantially independent fibers of protein when coagulated. However, the zones of protein are not completely independent of each other and are joined at sufficient locations to bind the individual zones into a branched or cross-linked structure. The degree of binding achieved is just sufficient to provide a cohesiveness to the final product similar to cooked meat, and does not destroy the substantially independent fibers. This binding, achieved during the formation of the fibers, eliminates the need for added binder materials.

Freezing is obtainable by cooling at least one surface, preferably one surface or two opposed surfaces, of the mixture to below the freezing temperature of the mixture. The cooling or refrigerating preferably causes freezing to take place throughout the thickness of the mass to produce generally parallel fibers, aligned generally perpendicularly to the cooling surfaces. Desirably, the cooling surface or surfaces will be planar; however, they can have any other, regular or irregular configuration. For example, a single cooling surface can be employed having a hemispherical, spherical or cylindrical configuration in contact with the aqueous protein mixture. In these exemplary situations, the ice crystals, and thus the protein fibers, would form generally perpendicularly to tangents to the surface, radiating generally toward the center. During freezing, a boundary between the frozen mixture and the liquid mixture appears and moves in the direction of cooling. At typical freezing temperatures employed according to the present invention, and where the cooling surface is not highly irregular, the boundary will generally conform to the shape of the cooled surface of the protein mixture. However, under other conditions according to the present invention, the boundary will assume a somewhat modified shape. It is to be understood that after an initial thickness of the mixture has been frozen, the moving boundary of freezing becomes the cooling surface through which heat transfer takes place. It is this moving boundary, which then controls the pattern of the formation of ice crystals and, therefore, fibers. The important consideration in all cases is the production of well-defined fibers having an orderly alignment similar to natural meat. If needed, the surfaces of the mass not in contact with the cooling source can be insulated to reduce heat transfer at these surfaces. It is observed, in most cases, that the surfaces not in contact with the one or the two opposed cooling surfaces exhibit a thickness of somewhat randomly oriented fibers. This is because directional cooling at these edges is difficult to obtain due to heat transfer with external sources. This edge portion can be either retained in the final product or severed therefrom such as by cutting with a knife, heated wire or the like. It is also noted that where cooling is effected from two opposed surfaces, horizontal surfaces of discontinuity appear, bisecting the thickness of the frozen mass. This is apparently due to the independent crystal growth from each of the opposed surfaces toward a plane of contact in the middle of the mass.

Many cooling sources can be employed according to the present invention. For example, the aqueous protein mixture can simply be placed in a pan and the pan set on a piece of dry ice or submerged to a slight depth (e.g. one-eighth inch) in a cold liquid such as liquid nitrogen, ethylene glycol, brine, or the like. Alternatively, a container of the aqueous protein material can be placed on a plate freezer or between two opposed plate freezers. Also suitable would be a moving belt type freezer of the kind illustrated in U.S. Pat. Nos. 3,253,420 and 3,606,763. The temperature employed can be any temperature effective to yield substantially independent, aligned ice crystals. It is noted that, while the rate of cooling is generally not a factor with regard to the formation of well defined, well-ordered, elongated fibers where the cooling is substantially unidirectional, the rate of cooling does definitely affect the size and shape of the crystal. Rapid cooling rates result in the formation of minute, microscopic ice crystals. Slower cooling or freezing rates result in the formation of long, needle-like ice crystals. Preferred cooling rates, defined in terms of the rate of advance of the freezing boundary, range from about 0.02 to about 1.0 ft/hr, more preferably from about 0.03 to about 0.5 ft/hr.

While there is nothing presently believed critical in the temperature of the protein solution or slurry prior to the freezing step, it is considered preferable to reduce the temperature of the solution or slurry to as close to the freezing point as possible prior to subjecting it to freezing. This is preferred at the present time solely on the basis of economics. It is less expensive to cool a liquid by conventional means with turbulence and high surface contact with the heat transfer media than to cool by means of the single or two opposed heat transfer elements employed for freezing. It is cautioned, however, that the liquid mixture should not be supercooled prior to the freezing operation as this will result in too rapid, random cooling and will produce an undesirable, random fiber structure in the product.

Unexpectedly, when this frozen material is immersed in a liquid, such as liquid nitrogen, substantially colder than the frozen mass, cleavage planes are produced perpendicular to the direction of fiber formation. A similar effect is noted when the frozen mass is immersed in a substantially warmer liquid. After stabilizing the protein, and heating as will be hereinafter discussed, the product can be rehydrated to give a surprisingly fish-like texture. While not wishing to be bound by any theory, a plausible explanation of what is occurring during this process is based on the manner in which the material reacts during freezing. During the unidirectional freezing step, a concentration gradient of the dissolved solids (e.g. salts, aminoacids, polypeptides etc.) is generated along the fiber axis. This gradient occurs repeatedly as the ice crystal front moves upward and away from the cooling surface. As a result, planes of high and low solids concentration are generated along the fiber axis. Corresponding to these planes are weak regions (planes) perpendicular to the fiber axis. When the frozen material is subsequently immersed in a bath at a substantially warmer or colder temperature, (e.g. liquid $N_2$), the expansion of the ice crystals along the fiber axis causes the fiber to crack along the weak planes thereby giving a structure similar to tuna fish muscle upon freeze-drying and heat setting. In the exemplary situation where the minimum dimension of the frozen mass is about two inches, the temperature during immersion is preferably at least 50° C colder or warmer than the frozen mass, and more preferably at least 100° C different. Where the minimum dimension is greater, the temperature difference must also be greater; where lesser, the temperature difference can be lesser.

After freezing, and shock temperature treating as described above, the crystalline structure of the material can be easily observed, if desired, by fracturing the frozen mass and observing it visually. To retain the integrity of the individual protein fibers thus formed, the protein is stabilized according to the present invention by freeze drying as disclosed in said Ser. No. 480,987, or by immersing the frozen mass in an aqueous solution, comprising an edible, water-soluble material capable of lowering the freezing point of water and stabilizing the protein. If the substantially soluble protein is not stabilized prior to heating, such as for heat setting, the heating will result in excessive bonding of the individual fibers due to melting of the ice crystal lattice separating them. As the fibers are then heat set, they tend to form a less distinctly fibrous mass. For fish analogs especially, this excessive bonding of the protein material is undesired. Also in this regard, the frozen mass should not be stored at temperatures which are only slightly below the freezing point of the mass for extended periods of time. Storage under these conditions will cause recrystallization of the ice and randomization of the fibrous structure. While this may be desirable to some extent as a means of affecting the texture of a final meat analog, it must only be done with the knowledge that reorientation is occuring, and it must be allowed to proceed only to the extent that would be desirable for a particular application.

The frozen mass can be freeze dried in conventional manner using conventional equipment. The product can be subdivided either before or after freeze drying. It should be dried sufficiently to reduce the moisture content to the point where the structure does not collapse. The details of freeze drying are well known to those skilled in the art and form no part of the present invention. A detailed discussion of freeze drying techniques which would be suitable according to the present invention reference is made to Van Arsdale, W.B., and Morgan, A.I.; Food Dehydration, Second ed., Vol. 1; AVI publishing. In an exemplary freeze drying situation a laboratory freeze dryer is employed to freeze a one inch thick slab having a total volume of 3 liters. The drying takes approximately two days to reduce the moisture content to a level of from about 3% to about 5%. In this specific set-up, the plate temperature is about 20° to about 30° C, preferably about 25° C; the condenser temperature is from about −40° to about −70° C, preferably about −50° C; and the pressure of the freeze drying chamber is from about 20 to about 50 microns, preferably from about 30 to about 40 microns, of Hg. This set of conditions is merely exemplary of those which can be employed and is not to be taken as limiting of the present invention. Any freeze drying technique which is capable of drying the fibers to self-sustaining form, preferably to a moisture content of less than about 10%, while not allowing substantial melting of the ice crystals to allow excessive bonding of the fibers and does not maintain the temperature at too high a level for a period of time which would cause randomization of the fibrous structure, would be effective and appropriate according to the present invention.

Alternatively, the frozen mass can be immersed in a stabilizing solution in any convenient manner using conventional equipment. The product can be subdivided either before or after immersion. Water miscible organic solvents have been previously used to precipitate proteins, and any of these known materials can be used as the stabilizing material in aqueous solution so long as they decrease water availability to the protein, decrease the hydrophillic potential of the protein by causing conformational changes in the protein, lower the freezing point of the water and lower the surface tension of the water. The amount of water available to the protein is reduced simply by the reduced mole fraction of water in the presence of these stabilizing materials. Thus, the water is less available for dissolving the protein. The effective stabilizing materials also enhance the displacement of the equilibria

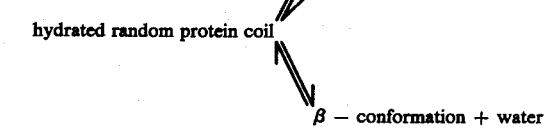

to the right, thereby adversely affecting the solubility of the proteins. The most effective stabilizing materials which can be employed, reduce the surface tension of the water and thereby reduce the contribution of the water to protein hydrophobic group adherence. The most noticeable deadherence effective in decreasing protein solubility is noticed, in the case of organic solvents, where the molecules have short, straight-chained hydrophobic groups. Reducing the freezing point of the water is essential because the stabilizing material must be able to penetrate the ice in the frozen product mass.

Among the suitable stabilizing materials are the polar organic solvents such as alcohols, with ethanol and propanol being preferred on the basis of their lack of toxicity even where large residual amounts of these solvents remain in the product. Ethanol is particularly preferred; however, any solvent can be employed so long as it has the indicated functionality and is not toxic at the reasonable levels which may remain in the product after removal of the solvent by known techniques such as extraction and drying. Also suitable as the stabilizing or coagulating materials are the known acids and salts having the necessary functionality in aqueous solution. If desired, these known salts and/or acids can be employed in combination with an alcohol, such as ethanol, or other organic solvent. Such combinations are desirable from the standpoint that it allows a balancing of the benefits and liabilities of the various stabilizing agents for a particular processing or product application. Among the suitable acids are hydrochloric, sulphuric, phosphoric, acetic and other edible acids. Among the suitable salts are the edible ammonium, alkali metal and alkaline earth salts of these acids as well as other salts having the indicated functionality.

While only exemplary of suitable stabilizing materials which can be employed, ethanol will be employed as the stabilizing material in the following discussion for conciseness. When a frozen mass of protein and ice prepared in the manner described above is brought into contact with ethyl alcohol in a coagulation bath, a diffusional interchange occurs between the two phases, water in the protein and the ice crystals, and ethyl alcohol. The ice crystals melt and water leaves while alcohol enters the protein phase. As soon as protein comes into contact with alcohol, it is insolubilized and the fibers stabilized. In order to insolubilize the protein completely, alcohol has to diffuse into the protein phase thoroughly. After a sufficient length of time, no more exchange takes place: hence, a state of equilibrium is achieved between the two phases. The final equilibrium concentration of alcohol in the coagulating bath is dependent on the ratio of alcohol to water in the frozen protein mass. The concentration of alcohol in this coagulating bath affects the freezing point of solution as well as the diffusion rate and coagulation rate of protein which are important factors to control in this process.

When the unidirectionally frozen protein mass is immersed in the alcohol bath to stabilize the freeze-aligned fibrous structure, the temperature of the bath must be lower than freezing point of the protein solution. This immobilizes free water and thereby minimizes rehydration of the protein and dissolution of the freeze-aligned structure by water. At the freezing temperature, water exists as ice crystals in the protein mass. When ice crystals contact with alcohol, the ice melts and water diffuses out; at the same time the protein also contacts with a sufficient concentration of alcohol and is insolubilized. If the temperature of alcohol bath is close to freezing point of water, higher than $-5°$ C, recrystallization takes place in the frozen protein block, and the unidirectional fibrous structure disappears and a random structure is formed.

Freezing point depression is dependent on the concentration of solute added in solution. Therefore, the freezing point of coagulating bath can be regulated by changing the concentration of alcohol. In order to prevent freezing the alcohol bath, the freezing point of coagulating solution must be lower than the processing temperature.

While any effective concentration of stabilizing material can be employed, in the case of ethanol, it is found that the concentration should be maintained at above about 10%, and preferably above 20%. With one particular sample using 5% ethanol, the protein was completely solubilized and fibrous structure was disintegrated. At 10%, the protein was partially solubilized and fibers were very soft. However, the fibers did not fall apart. At 20% alcohol, the protein was not solubilized. The texture was soft due to partial hydration. At higher than 30% alcohol, the protein was completely insoluble and the texture of the fibrous material was hard. When the final equilibrium concentration of alcohol in this coagulation process was higher than 70%, the fibers were very fragile due to excessive dehydration of protein. It appears that optimum concentration at equilibrium was about 60% of ethyl alcohol.

Ethanol soluble pigments, carbohydrates, oil and fat in protein materials are diffused out during this process. This is desirable from the standpoint of removing pigments and flatulents from the products. Fat and oil can be recovered and used in foods.

Once stabilized by freeze drying or immersion as described above, the fibrous mass can be dried, stored for indefinite periods of time and later heat set; or heat set immediately and then stored for subsequent use. It is possible through the proper selection of the particular type of heat treatment, to effect the texture, color, toughness, tensile strength, rehydration and water retention properties of the final product. Textured materials receiving severe heat treatment tend to retain less water upon rehydration. However, all textured materials according to the present invention preferably receive an amount of heat treatment sufficient to increase the structural integrity of the fibers. Materials receiving mild heat treatment tend to be softer and more pliable than those which receive severe heat treatment. Moist heat treatment is highly efficient and gives an extremely good meat-like texture to the final product.

The amount of heat treatment, with or without pressure, to stabilize the product varies with the type of protein materials used. By way of example, dry soy milk fibers are preferably heat treated in an autoclave under a 15 psig pressure for from about 5 to 10 minutes to stabilize the structure, and fibers from soy flour, on the other hand, are preferably heat treated for from 20 to about 25 minutes under the same conditions. Any combination of time, temperature, and pressure effective to heat set the protein into substantially independent fibers can be employed according to the present invention. It appears that heat treatment at a temperature ranging from about 100° to about 120° C for a time of from about 5 to about 30 minutes is adequate depending upon the texture desired in the final product. The exact times, temperatures, and pressures employed will be easily determinable by those skilled in the art for a wide variety of products. Reference to the examples below will show a number of specific heat treatment operations which will guide those skilled in the art.

Typical of the heating means which can be employed are conventional autoclave or steam chamber devices capable of producing pressures of up to about 20 psig and temperatures of up to about 130° C. Also suitable would be electric or gas-fired infrared ovens capable of operating under conditions of high relative humidity. The use of moist heat in such devices, or in the autoclave or steam chambers previously mentioned, aids in providing a more complete coagulation or immobilization of the protein materials. The specific heating means employed is not critical to the present invention. All that is necessary is that the heat be sufficient in time and intensity to coagulate or immobilize the protein sufficiently to substantially prevent loss of the individual protein fibers upon rehydration.

After heat setting, the fibrous protein material can be marketed as is, or rehydrated immediately to obtain a more meat-like texture. The product is easily rehydrated by soaking in water for a period of time effective to obtain a desired water content. The rehydrating solution can contain acids for neutralizing any residual alkali, or flavorings, emulsified fats, flavor enhancers, condiments, sugars, heat coagulable or soluble proteins, amino acids, and the like. In this manner, the product can be modified to have the taste as well as the texture of fish. Of course, as indicated previously, these ingredients can also be employed in the aqueous protein mixture before freezing. Experience with particular recipes will dictate at what point these additives are employed.

The following examples are presented for the purpose of further explaining and illustrating the present invention, and are not to be taken as limiting in any regard. Unless otherwise indicated, all parts and percentages are by weight.

EXAMPLE I

To prepare a texturized soy protein product having highly-oriented, well-defined fibers in a fish-like texture, a soy milk is used as a protein source. The soy milk is prepared by soaking 600 grams of soy beans overnight in water, changing the water several times. The soaked beans are then hot ground with boiling water, the water being present at a 10:1 ratio with regard to the soy beans. The resulting slurry is heated to boiling and held there for 15 minutes, and filtered through a double layer of cheesecloth. The residue on the cheesecloth is discarded and the level of solids in the supernatant is determined. The pH of the supernatant is then adjusted to 7.5 using 2N sodium hydroxide, and an antioxidant is added to the supernatant at a level equivalent to 0.02% of the fat content. Because full fat soy beans are employed, the fat content of the supernatant is about one-fourth the weight of the solids present. The soy bean milk is then placed in an aluminum pan to a depth of about one inch. The pan is placed on a block of dry ice (−76° C) which extends across the entire bottom surface of the pan. Unidirectional ice crystals, substantially perpendicular to the bottom of the pan, are generated. The mass is completely frozen in about 30 minutes. The frozen mass is then placed in liquid nitrogen for about one minute during which time this shock cooling causes planes of fractures transverse to the direction of alignment of the fibers. The frozen mass is removed from the pan and immersed in 95% ethanol at the weight ratio of 1:4 for 8 hours with stirring at a temperature ranging from −5° to −10° C. The stabilized fibrous material is pressed by applying force perpendicular to the direction of fibers to hasten the release of ethyl alcohol trapped in the spaces between the fibers. The pressed product is then air dried to remove water and residual ethanol. This drying process strengthens the structure. This dried material is autoclaved at 15 psig for 10 minutes to strengthen the structure. The heat set material is then rehydrated by soaking in water for about 20 minutes to yield a product having discrete, soft, chewy, fish-like fibers.

EXAMPLE II

To prepare a texturized soy protein product having highly-oriented, well-defined fibers in a fish-like texture, a soy milk is used as a protein source. The soy milk is prepared by soaking 600 grams of soy beans overnight in water, changing the water several times. The soaked beans are then hot ground with boiling water, the water being present at a 10:1 ratio with regard to the soy beans. The resulting slurry is heated to boiling and held there for 15 minutes, and filtered through a double layer of chessecloth. The residue on the cheesecloth is discarded and the level of supernatant is then adjusted to 7.5 using 2N sodium hydroxide, and an antioxidant is added to the supernatant at a level equivalent to 0.02% of the fat content. Because full fat soy beans are employed, the fat content of the supernatant is about one-fourth the weight of the solids present. The soy bean milk is then poured into a two inch cellulose sausage casing to a height of about one foot. The casing is lowered in one-half inch intervals into a bath cooled to −40° C. The soy milk is allowed to freeze to a height of about 1½ inches above the surface of the bath each time before further lowering the casing until the ice-liquid interface is about 1 inch above the surface of the bath. Unidirectional ice crystals, substantially perpendicular to the surface of the bath, are generated. Lowering the casing from the air above the bath into the bath causes shock stressing of the mass and fracturing at planes of weakness due to the temperature differential between the mass as maintained above and below the surface of the bath. The frozen mass is removed from the pan and immersed in 95% ethanol at the weight ratio of 1:4 for 8 hours with stirring at a temperature ranging from −5° to −10° C. The stabilized fibrous material is pressed by applying force perpendicular to the direction of fibers to hasten the release of ethyl alcohol trapped in the spaces between the fibers. The pressed product is then air dried to remove water and residual ethanol. This drying process strengthens the structure. This dried material is autoclaved at 15 psig for 10 minutes to strengthen the structure. The heat set material is then rehydrated by soaking in water for about 20 minutes to yield a product having discrete, soft, chewy, fish-like fibers.

EXAMPLE III

The procedure of Example II is repeated, but this time the material is freeze dried instead of immersing it in the ethanol. The freeze dried material is then treated with moist heat at 15 psig for 10 minutes to stabilize the structure.

EXAMPLE IV

A fibrous soy protein product is prepared from soy protein isolate. Here 100g of soy protein isolate (91% protein) was mixed with 900g of water to make 10% solution and pH was adjusted to 7.0–8.0. This solution is placed in a pan to a depth of about 1 inch and frozen and stabilized as described in Example I.

EXAMPLE V

A fibrous peanut protein product is prepared from peanut protein isolate. Here 150g of peanut protein isolate (93% protein) was mixed with 850g of water to make 15% solution and pH was adjusted to 7.0–8.0. This solution is placed in a pan to a depth of about 1 inch and frozen and stabilized as described in Example III.

EXAMPLE VI

A fibrous egg albumin product is prepared from fresh egg white. The whites of several eggs are separated from the yolks, placed in a pan, frozen and stabilized as described in Example I. Here 10% egg albumin solution prepared from egg white powder can be successfully used.

EXAMPLE VII

A fibrous fish protein product is prepared from a 15% aqueous mixture of fresh fish meat. To prepare the aqueous mixture, 150g of lean fish meat is homogenized with 850 ml of cold 3% Nacl aqueous solution in a Waring Blendor at high speed for about 5 minutes under vacuum. The resulting homogenate mixture is then placed in a pan, frozen, and stabilized as described in Example III.

EXAMPLE VIII

The procedure of Example I is again repeated, but this time the soybean milk is concentrated as follows: The pH of the soybean milk is adjusted to 4.5 by adding HCl (1N). The resulting precipitate is separated by centrifugation at 5,000 × G for 20 minutes. The supernatant is discarded. The precipitate is transferred to a mixer and mixed with water for 20 minutes to get a smooth and concentrated (18 to 20% solids) soybean milk. The soybean milk slurry is then adjusted to a pH of about 7.5 using 2N sodium hydroxide and the resulting solution is placed in a pan, frozen and further processed as in Example I.

Many modifications and variations of the present invention will be apparent to those skilled in the art upon reading the above disclosure. It is intended that all such modifications and variations be included within the scope of the present invention which is defined by the following claims.

What is claimed is:

1. A method for preparing a texturized protein material comprising:
   (a) preparing a mixture comprising heat coagulable protein and water;
   (b) cooling the mixture to freeze the water into elongated ice crystals and to separate the protein into well-defined, well-ordered, substantially independent zones;
   (c) subjecting the frozen mass to a temperature at least 50° C different from that of the frozen mass to cause shock fracturing of the material at lines of weakness in the frozen mass perpendicular to the elongated ice crystals;
   (d) stabilizing the protein in the frozen mass effectively to prevent loss of fibrous structure upon subsequent heating; and
   (e) heating the stabilized material to coagulate the protein.

2. A method according to claim 1 wherein the protein is stabilized by freeze drying.

3. A method according to claim 1 wherein the protein in the frozen mass is stabilized by immersing the frozen mass into an aqueous solution, comprising an edible, water-soluble material capable of lowering the freezing point of water and stabilizing the protein, for a time effective to stabilize the protein in the frozen mass.

4. A method according to claim 3 wherein the edible water soluble material capable of lowering the freezing point of water and stabilizing the protein comprises a member selected from the group consisting of ethanol and propanol.

5. A method according to claim 4 wherein the edible water soluble material capable of lowering the freezing point of water and stabilizing the protein comprises ethanol.

6. A method according to claim 5 wherein the ethanol is employed in the aqueous solution at a concentration of greater than 20% based on the weight of solution prior to immersion of the frozen mass therein.

7. A method according to claim 6 wherein the stabilized protein is treated to remove residual ethanol.

8. A method according to claim 7 wherein the residual ethanol is removed by subjecting the stabilized protein to a vacuum.

9. A method according to claim 1 wherein the pH of the mixture comprising protein and water is adjusted to increase the solubility of the protein.

10. A method according to claim 1 wherein the temperature of step (c) is at least 50° C below that of the frozen mass.

* * * * *